US012613131B2

(12) United States Patent
Hui et al.

(10) Patent No.: US 12,613,131 B2
(45) Date of Patent: Apr. 28, 2026

(54) OPTICAL PROXIMITY SENSOR

(71) Applicant: Apple Inc., Cupertino, CA (US)

(72) Inventors: Brandon J. Hui, San Francisco, CA (US); Yaser Shanjani, Fremont, CA (US); Mark T. Winkler, Menlo Park, CA (US); Tong Chen, Fremont, CA (US); Michael K. McCord, San Francisco, CA (US); Runyu Liu, Sunnyvale, CA (US); Aaron Krahn, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 573 days.

(21) Appl. No.: 18/077,988

(22) Filed: Dec. 8, 2022

(65) Prior Publication Data

US 2024/0102852 A1 Mar. 28, 2024

Related U.S. Application Data

(60) Provisional application No. 63/409,187, filed on Sep. 22, 2022.

(51) Int. Cl.
*G01J 1/02* (2006.01)
*G01J 1/04* (2006.01)

(52) U.S. Cl.
CPC ........... *G01J 1/0271* (2013.01); *G01J 1/0407* (2013.01)

(58) Field of Classification Search
CPC .......... G01J 1/00; G01J 1/0214; G01J 1/0271; G01J 1/0403; G01J 1/0407; G01J 1/0411; G01J 1/06
See application file for complete search history.

(56) References Cited

U.S. PATENT DOCUMENTS

| | | | |
|---|---|---|---|
| 5,539,562 | A | 7/1996 | Morioka |
| 5,974,071 | A | 10/1999 | Jiang et al. |
| 5,978,401 | A | 11/1999 | Morgan |
| 6,055,262 | A | 4/2000 | Cox et al. |
| 6,253,097 | B1 | 6/2001 | Aronow et al. |
| 6,272,269 | B1 | 8/2001 | Naum |
| 6,310,707 | B1 | 10/2001 | Kawase et al. |
| 6,348,684 | B1 | 2/2002 | Nykolak et al. |

(Continued)

FOREIGN PATENT DOCUMENTS

| | | |
|---|---|---|
| CN | 2738434 | 11/2005 |
| CN | 101592605 | 12/2009 |

(Continued)

OTHER PUBLICATIONS

U.S. Appl. No. 18/143,517, filed May 4, 2023, Lin et al.

(Continued)

*Primary Examiner* — Georgia Y Epps
(74) *Attorney, Agent, or Firm* — Brownstein Hyyatt Farber Schreck, LLP

(57) ABSTRACT

An optical proximity sensor includes a housing, an optical emitter, and an optical detector. A first light guide disposed in a first chimney of the housing is configured to direct light from the optical emitter through the first chimney towards a target location. A second light guide disposed in a second chimney of the housing is configured to direct a returned portion of the light emitted from the optical emitter through the second chimney towards the optical detector.

18 Claims, 13 Drawing Sheets

(56) References Cited

U.S. PATENT DOCUMENTS

| | | | |
|---|---|---|---|
| 6,459,835 B1 | 10/2002 | Nagaoka et al. | |
| 6,574,398 B2 | 6/2003 | Coldren et al. | |
| 6,592,245 B1 | 7/2003 | Tribelsky et al. | |
| 6,597,713 B2 | 7/2003 | Ouchi | |
| 6,636,539 B2 | 10/2003 | Martinsen | |
| 6,814,901 B2 | 11/2004 | Itoh | |
| 6,829,442 B2 | 12/2004 | Murray | |
| 6,931,042 B2 | 8/2005 | Choquette et al. | |
| 6,967,754 B2 | 11/2005 | Bratt et al. | |
| 6,987,306 B2 | 1/2006 | Fathimulla et al. | |
| 7,030,359 B2 | 4/2006 | Römhild | |
| 7,157,298 B2 | 1/2007 | Nakayama et al. | |
| 7,264,408 B2 | 9/2007 | Togami et al. | |
| 7,277,463 B2 | 10/2007 | Guenter | |
| 7,286,766 B2 | 10/2007 | Shelton | |
| 7,324,574 B2 | 1/2008 | Kim | |
| 7,349,604 B2 | 3/2008 | Clark | |
| 7,446,359 B2 | 11/2008 | Lee et al. | |
| 7,692,859 B2 | 4/2010 | Redert | |
| 7,791,591 B2 | 9/2010 | Collins et al. | |
| 7,804,875 B2 | 9/2010 | Park et al. | |
| 8,038,822 B2 | 10/2011 | Kindler | |
| 8,073,343 B2 | 12/2011 | Yuki et al. | |
| 8,113,724 B2 | 2/2012 | Terada et al. | |
| 8,153,502 B2 | 4/2012 | Li | |
| 8,319,311 B2 | 11/2012 | Chen | |
| 8,457,170 B2 | 6/2013 | Gerlach | |
| 8,467,428 B2 | 6/2013 | Gerlach et al. | |
| 8,598,673 B2 | 12/2013 | Joshi | |
| 8,742,350 B2 * | 6/2014 | Yao | G01S 17/04 |
| | | | 250/338.1 |
| 8,783,893 B1 | 7/2014 | Seurin et al. | |
| 8,823,859 B2 | 9/2014 | Fujimori et al. | |
| 8,890,844 B2 | 11/2014 | Hung et al. | |
| 8,917,752 B2 | 12/2014 | Chung | |
| 8,976,158 B2 | 3/2015 | Eriksson et al. | |
| 8,988,574 B2 | 3/2015 | Oshima et al. | |
| 8,995,841 B1 | 3/2015 | Chalfant, III et al. | |
| 9,091,747 B2 | 7/2015 | Pruijmboom | |
| 9,112,330 B2 | 8/2015 | Gronenborn et al. | |
| 9,164,625 B2 | 10/2015 | Holmgren et al. | |
| 9,171,723 B2 | 10/2015 | Hallam | |
| 9,215,293 B2 | 12/2015 | Miller | |
| 9,223,054 B2 * | 12/2015 | Morita | G06F 3/0304 |
| 9,305,967 B1 | 4/2016 | Tharumalingam | |
| 9,312,954 B2 | 4/2016 | Chen et al. | |
| 9,318,873 B2 | 4/2016 | Nagatomo | |
| 9,397,476 B2 | 7/2016 | Baier | |
| 9,406,716 B2 | 8/2016 | Lin | |
| 9,525,093 B2 | 12/2016 | Costello et al. | |
| 9,544,539 B2 | 1/2017 | Roman | |
| 9,612,390 B2 | 4/2017 | Thompson et al. | |
| 9,684,074 B2 | 6/2017 | Schrank et al. | |
| 9,799,727 B2 | 10/2017 | Zhou | |
| 9,810,862 B2 | 11/2017 | Graves et al. | |
| 9,825,086 B2 | 11/2017 | Kawahara | |
| 9,860,965 B2 | 1/2018 | Recker et al. | |
| 9,917,643 B2 | 3/2018 | Shatz et al. | |
| 9,929,806 B2 | 3/2018 | Wabnig et al. | |
| 9,998,217 B2 | 6/2018 | Li et al. | |
| 10,031,158 B1 | 7/2018 | Douglas et al. | |
| 10,032,946 B2 | 7/2018 | Lanzara et al. | |
| 10,072,815 B2 | 9/2018 | Mackinnon et al. | |
| 10,148,365 B2 | 12/2018 | Sundaram | |
| 10,153,614 B1 | 12/2018 | Lin et al. | |
| 10,177,186 B2 | 1/2019 | Wang | |
| 10,181,895 B2 | 1/2019 | Liu | |
| 10,222,475 B2 | 3/2019 | Pacala et al. | |
| 10,267,505 B2 | 4/2019 | Van de Sluis et al. | |
| 10,293,691 B2 | 5/2019 | Mishra et al. | |
| 10,305,605 B2 | 5/2019 | Sun et al. | |
| 10,353,130 B2 | 7/2019 | Vandenberg et al. | |
| 10,367,021 B2 | 7/2019 | Jangjian | |
| 10,371,328 B2 | 8/2019 | Poage | |
| 10,431,571 B2 * | 10/2019 | Rudmann | H01L 25/50 |
| 10,473,764 B2 | 11/2019 | Townsend | |
| 10,476,591 B2 | 11/2019 | Laycock | |
| 10,511,383 B2 | 12/2019 | Tiecke et al. | |
| 10,571,680 B2 | 2/2020 | Igarashi | |
| 10,574,916 B2 | 2/2020 | Fukuda | |
| 10,601,507 B2 | 3/2020 | Wabnig et al. | |
| 10,663,586 B2 | 5/2020 | Pacala et al. | |
| 10,700,780 B2 | 6/2020 | Momtahan et al. | |
| 10,705,347 B2 | 7/2020 | Chen et al. | |
| 10,756,815 B2 | 8/2020 | Shih et al. | |
| 10,764,053 B2 | 9/2020 | Brook et al. | |
| 10,840,396 B2 | 11/2020 | Balimann et al. | |
| 10,871,820 B2 | 12/2020 | Mutlu et al. | |
| 10,903,913 B2 | 1/2021 | Sundaram | |
| 10,911,727 B2 | 2/2021 | MacKinnon | |
| 10,935,215 B1 | 3/2021 | Lin et al. | |
| 10,948,567 B2 | 3/2021 | Eberspach et al. | |
| 11,092,531 B2 | 8/2021 | Spruit et al. | |
| 11,099,347 B2 | 8/2021 | Takenaka et al. | |
| 11,119,219 B1 | 9/2021 | LaChapelle et al. | |
| 11,157,113 B2 | 10/2021 | Winkler et al. | |
| 11,169,446 B2 | 11/2021 | Dietrich et al. | |
| 11,187,643 B2 | 11/2021 | Jutte et al. | |
| 11,201,669 B2 | 12/2021 | Momtahan et al. | |
| 11,303,355 B2 | 4/2022 | Momtahan | |
| 11,381,060 B2 | 7/2022 | Laflaquiere et al. | |
| 11,381,307 B2 | 7/2022 | Joseph | |
| 11,448,736 B2 | 9/2022 | Hosseini et al. | |
| 11,549,799 B2 | 1/2023 | Tan et al. | |
| 11,789,156 B1 | 10/2023 | Michaels et al. | |
| 2003/0036356 A1 | 2/2003 | Witehira et al. | |
| 2003/0043435 A1 | 3/2003 | Oettinger et al. | |
| 2003/0053506 A1 | 3/2003 | Coldren | |
| 2004/0057228 A1 | 3/2004 | Huang et al. | |
| 2005/0040410 A1 | 2/2005 | Ledentsov et al. | |
| 2005/0168445 A1 | 8/2005 | Piot et al. | |
| 2005/0224701 A1 | 10/2005 | Austin | |
| 2006/0103941 A1 | 5/2006 | Yamaguchi et al. | |
| 2007/0133642 A1 | 6/2007 | Park et al. | |
| 2011/0278692 A1 | 11/2011 | Takeuchi et al. | |
| 2011/0297832 A1 * | 12/2011 | Yao | H05K 1/183 |
| | | | 29/829 |
| 2012/0006382 A1 | 1/2012 | Dagli et al. | |
| 2012/0019695 A1 | 1/2012 | Qian et al. | |
| 2014/0213034 A1 | 7/2014 | Chang et al. | |
| 2015/0144918 A1 | 5/2015 | Cho et al. | |
| 2015/0311673 A1 | 10/2015 | Wang et al. | |
| 2016/0178884 A1 | 6/2016 | Hanada et al. | |
| 2016/0306042 A1 * | 10/2016 | Schrank | G01S 17/04 |
| 2018/0278828 A1 | 9/2018 | Moon | |
| 2018/0341094 A1 | 11/2018 | Brukilacchio | |
| 2019/0258175 A1 * | 8/2019 | Dietrich | G02B 6/305 |
| 2019/0331473 A1 | 10/2019 | Johnson et al. | |
| 2019/0369405 A1 * | 12/2019 | Chen | F21V 5/004 |
| 2020/0370922 A1 | 11/2020 | Mort et al. | |
| 2021/0091472 A1 * | 3/2021 | Avser | H01Q 9/0485 |
| 2021/0119338 A1 * | 4/2021 | Avser | H01Q 21/0075 |
| 2022/0231761 A1 | 7/2022 | Momtahan | |
| 2023/0089141 A1 | 3/2023 | Chen et al. | |
| 2023/0152081 A1 | 5/2023 | Tan et al. | |
| 2023/0213629 A1 | 7/2023 | Zhou et al. | |
| 2024/0102852 A1 * | 3/2024 | Hui | G01S 7/4818 |
| 2024/0384980 A1 | 11/2024 | Chen et al. | |
| 2025/0102630 A1 | 3/2025 | Chen et al. | |
| 2025/0277899 A1 | 9/2025 | Lyon et al. | |

FOREIGN PATENT DOCUMENTS

| | | |
|---|---|---|
| CN | 102427573 | 4/2012 |
| CN | 102575925 | 7/2012 |
| CN | 105716526 | 6/2016 |
| CN | 109154552 | 1/2019 |
| CN | 109428261 | 3/2019 |
| EP | 3176888 | 6/2017 |
| JP | 2000174543 | 6/2000 |
| JP | 2004047636 | 2/2004 |
| JP | 2006203111 | 8/2006 |
| KR | 1020070061191 | 6/2007 |
| KR | 1020190039927 | 4/2019 |

(56) References Cited

FOREIGN PATENT DOCUMENTS

| | | |
|----|----|----|
| WO | WO 10/111961 | 10/2010 |
| WO | WO 17/218467 | 12/2017 |
| WO | WO 18/128904 | 7/2018 |
| WO | WO 22/112679 | 6/2022 |
| WO | WO 23/003550 | 1/2023 |

OTHER PUBLICATIONS

Sayyah et al., "Fully Integrated FMCW LiDAR Optical Engine on a Single Silicon Chip," *Journal of Lightwave Technology*, vol. 40, No. 9, May 1, 2022, pp. 2763-2772.
Huang et al., "A nanoelectromechanical tunable laser," *nature photonics*, vol. 2, Mar. 2008, pp. 180-184.
Leitgeb et al., "Using Tapers for Efficient Coupling of Received FSO-Signals into Fibres," 13th International Conference on Transparent Optical Networks in Stockholm, Sweden, Jun. 26-30, 2011, Institute of Broadband Communications, University of Technology, Graz, Austria, pp. 1-6.

* cited by examiner

OPTICAL PROXIMITY SENSOR

CROSS-REFERENCE TO RELATED APPLICATION

This application is a nonprovisional and claims the benefit under 35 U.S.C. 119(e) of U.S. Provisional Patent Application No. 63/409,187, filed Sep. 22, 2022, the contents of which are incorporated herein by reference as if fully disclosed herein.

TECHNICAL FIELD

Embodiments described herein relate to optical sensors, and in particular optical proximity sensors.

BACKGROUND

Consumer electronic devices may include a display and one or more user-facing sensors such as a front-facing camera, proximity sensor, ambient light sensor, fingerprint reader, depth-sensing camera, or the like. Generally, it is desirable to maximize the area of a user-facing portion of a device dedicated to the display while minimizing or otherwise obscuring the area dedicated to the user-facing sensors. Accordingly, there is a demand for user-facing sensors having a smaller footprint and/or sensing aperture. Further, there is a continuing demand for user-facing sensors having high sensing fidelity.

SUMMARY

Embodiments described herein relate to optical proximity sensors. In one embodiment, an optical proximity sensor includes a housing, an optical emitter, an optical detector, a first light guide, and a second light guide. The housing defines a first chimney and a second chimney. The first light guide is disposed in the first chimney, and comprises a first dielectric material. The first light guide is configured to direct light emitted from the optical emitter through the first chimney. The second light guide is disposed in the second chimney, and comprises a second dielectric material. The second light guide is configured to direct a returned portion of the light emitted from the optical emitter though the second chimney towards the optical detector.

In one embodiment, the second light guide includes a light input end, a light output end, and a shaft disposed between the light input end and the light output end. The light input end is positioned to receive the returned portion of the light emitted from the optical emitter. The light output end is positioned to direct the returned portion of the light emitted from the optical emitter towards the optical detector. The shaft has a taper that increases a cross-sectional area of the shaft as it extends away from the light input end of the second light guide.

In one embodiment, the first chimney and the second chimney share a common base. The first light guide may extend into the first chimney for a first length, while the second chimney may extend into the second chimney for a second length, which is different than the first length.

In one embodiment, the first light guide includes a light input end positioned to receive light emitted from the optical emitter, the light input end being positioned a first distance away from the optical emitter. The second light guide includes a light output end positioned to direct the returned portion of light towards the optical detector, the light output end being positioned a second distance away from the optical detector, which is different than the first distance.

In one embodiment, the first light guide includes a flange, which at least partially defines a length that the first light guide extends into the first chimney. The first chimney may include a stepped profile, and the flange may abut a step in the stepped profile of the first chimney. An adhesive may be between the flange and the step.

In one embodiment, the optical proximity sensor further includes a reference optical detector configured to receive a portion of the light emitted from the optical detector. The flange may be configured to limit light propagation from the optical emitter to the reference optical detector. A portion of the housing may further limit light propagation from the optical emitter to the reference optical detector.

In one embodiment, the flange of the first light guide includes a coating opaque to the light emitted from the optical emitter.

In one embodiment, the second light guide comprises a flange, which comprises a third dielectric material that is different from the second dielectric material.

In one embodiment, the first light guide includes a shaft and a light input end. The light input end is positioned to receive light emitted from the optical emitter and has a light input surface, which is tilted at a non-perpendicular angle with respect to an axis of the shaft.

In one embodiment, the first light guide includes a light output end positioned to direct the light emitted from the optical detector towards a target location. The second light guide includes a light input end positioned to receive the returned portion of the emitted light. The optical emitter and the optical detector may be separated by a first distance, while the light output end of the first light guide and the light input end of the second light guide are separated by a second distance, which is different than the first distance.

In one embodiment, the first light guide includes a light input end and a light output end. The light input end may be positioned to receive light emitted from the optical emitter, and the light output end may be positioned to direct the light emitted from the optical emitter towards a target location. The light output end may be defined by a circular segment cutout. The circular segment cutout may be oriented towards the second light guide.

In one embodiment, the first light guide includes a light input end, a light output end, and a shaft between the light input end and the light output end. The light input end may be positioned to receive light emitted from the optical emitter, and the light output end may be positioned to direct the light emitted from the optical emitter towards a target location. The shaft may transition between a circular cross-section and an oval cross-section between the light input end and the light output end.

In one embodiment, an optical proximity sensor includes a housing defining a first chimney and a second chimney, a first reflective coating on an interior surface of the first chimney, a second reflective coating on an interior surface of the second chimney, an optical emitter, and an optical detector. The optical emitter may be configured to emit light into the first chimney, the first reflective coating guiding the light emitted from the optical emitter through the first chimney. The optical detector may be configured to receive a returned portion of the light emitted from the optical emitter, the second reflective coating guiding the returned portion of the light emitted from the optical emitter through the second chimney.

In one embodiment, the first reflective coating and the second reflective coating comprise gold. In an additional embodiment, the first reflective coating and the second reflective coating further comprise titanium and silicon dioxide.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to optical sensors, and in particular to optical proximity sensors. In one embodiment, an optical sensor includes a body, an optical emitter, and an optical detector. The body may include a first chimney and a second chimney, in which a first light guide and a second light guide are disposed, respectively. The first light guide may be configured to direct light from the optical emitter through the first chimney towards a target location. The second light guide may be configured to direct a returned portion of the light emitted from the optical emitter (e.g., a portion of the light reflected from an object) through the second chimney towards the optical detector.

The first light guide and the second light guide may comprise the same or different dielectric materials. As a result, the first light guide and the second light guide may be precisely manufactured (e.g., via an injection molding process), and include additional features, such as, for example, tapered shafts, flanges, and angled faces, as discussed herein. This may enable the optical proximity sensor to provide high sensing fidelity, and further may enable a reduction in the area required to operate the sensor, for example, at one or more apertures in a user-facing portion of a device.

Figure 1A:
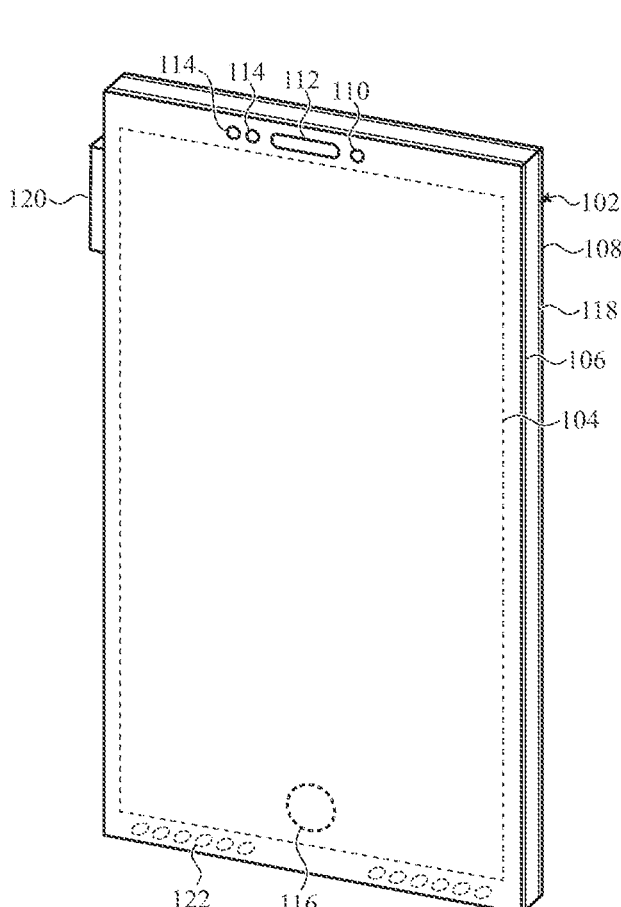
FIGS. 1A and 1B illustrate a portable electronic device, such as described herein.
Figure 1B:
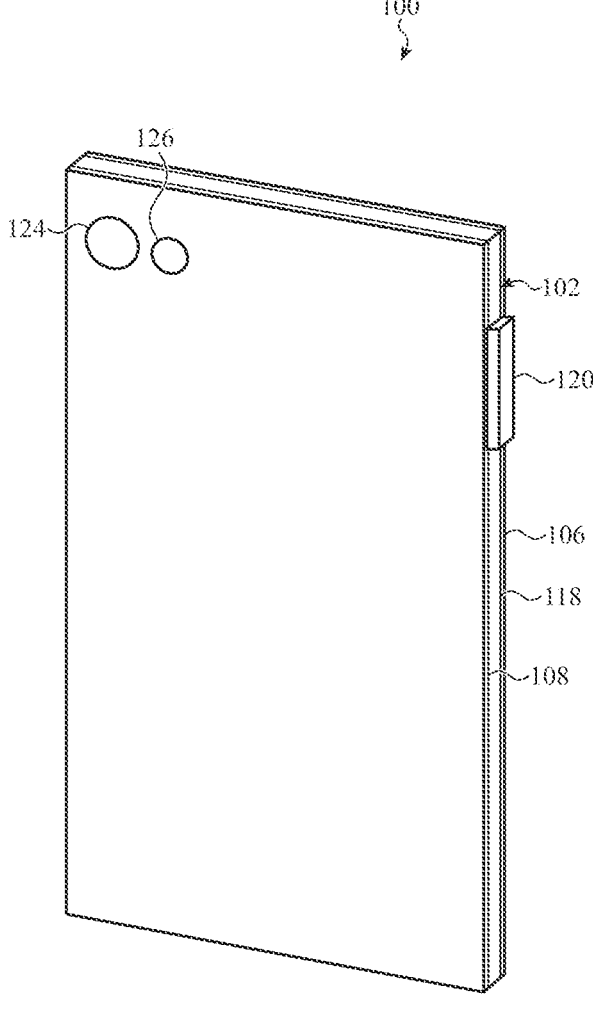

FIGS. 1A and 1B show a first example of a device 100 that may include an optical proximity sensor. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device including, for example, a mobile phone, tablet computer, portable computer, portable music player, health monitor device, portable terminal, vehicle navigation system, robot navigation system, or other portable or mobile device. The device 100 could also be a device that is semi-permanently located (or installed) at a single location. FIG. 1A shows a front isometric view of the device 100, and FIG. 1B shows a rear isometric view of the device 100. The device 100 may include a housing 102 that at least partially surrounds a display 104. The housing 102 may include or support a front cover 106 or a rear cover 108. The front cover 106 may be positioned over the display 104, and may provide a window through which the display 104 may be viewed. In some embodiments, the display 104 may be attached to (or abut) the housing 102 and/or the front cover 106. In alternative embodiments of the device 100, the display 104 may not be included and/or the housing 102 may have an alternative configuration.

The display 104 may include one or more light-emitting elements including, for example, an LED, OLED, liquid crystal display (LCD), electroluminescent (EL) display, or other type of display element. In some embodiments, the display 104 may include, or be associated with, one or more touch and/or force sensors that are configured to detect a touch and/or a force applied to a surface of the front cover 106.

The various components of the housing 102 may be formed from the same or different materials. For example, the sidewall 118 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover 106) may be coated with an opaque ink to obscure components included within the housing 102. The rear cover 108 may be formed using the same material(s) that are used to form the sidewall 118 or the front cover 106. In some cases, the rear cover 108 may be part of a monolithic element that also forms the sidewall 118 (or in cases where the sidewall 118 is a multi-segment sidewall, those portions of the sidewall 118 that are non-conductive). In still other embodiments, all of the exterior components of the housing 102 may be formed from a transparent material, and components within the device 100 may or may not be obscured by an opaque ink or opaque structure within the housing 102.

The front cover 106 may be mounted to the sidewall 118 to cover an opening defined by the sidewall 118 (i.e., an opening into an interior volume in which various electronic components of the device 100, including the display 104, may be positioned). The front cover 106 may be mounted to the sidewall 118 using fasteners, adhesives, seals, gaskets, or other components.

A display stack or device stack (hereafter referred to as a "stack") including the display 104 may be attached (or abutted) to an interior surface of the front cover 106 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 106 (e.g., to a display surface of the device 100).

In some cases, a force sensor (or part of a force sensor system) may be positioned within the interior volume below and/or to the side of the display 104 (and in some cases within the device stack). The force sensor (or force sensor system) may be triggered in response to the touch sensor detecting one or more touches on the front cover 106 (or a location or locations of one or more touches on the front cover 106), and may determine an amount of force associated with each touch, or an amount of force associated with the collection of touches as a whole.

As shown primarily in FIG. 1A, the device 100 may include various other components. For example, the front of the device 100 may include one or more front-facing cameras 110, speakers 112, microphones, or other user-facing sensors 114 (e.g., an optical proximity sensor as described in various embodiments herein). In one embodiment, the user-facing sensors 114 include an optical proximity sensor having a light emission path and a light reception path, such as described herein. In some cases, a front-facing camera 110, alone or in combination with other sensors, may be configured to operate as a bio-authentication or facial recognition sensor. The device 100 may also include various input devices, including a mechanical or virtual button 116, which may be accessible from the front surface (or display surface) of the device 100. In some cases, the front-facing camera 110, virtual button 116, and/or other sensors of the device 100 may be integrated with a display stack of the display 104 and moved under the display 104.

The device 100 may also include buttons or other input devices positioned along the sidewall 118 and/or on a rear surface of the device 100. For example, a volume button or multipurpose button 120 may be positioned along the sidewall 118, and in some cases may extend through an aperture in the sidewall 118. The sidewall 118 may include one or more ports 122 that allow air, but not liquids, to flow into and out of the device 100. In some embodiments, one or more sensors may be positioned in or near the port(s) 122. For example, an ambient pressure sensor, ambient temperature sensor, internal/external differential pressure sensor, gas sensor, particulate matter sensor, or air quality sensor may be positioned in or near a port 122.

In some embodiments, the rear surface of the device 100 may include a rear-facing camera 124 or other optical sensor (see FIG. 1B). A flash or light source 126 may also be positioned along the rear of the device 100 (e.g., near the rear-facing camera). In some cases, the rear surface of the device 100 may include multiple rear-facing cameras.

As discussed above, it may be desirable to maximize the portion of the device 100 dedicated to the display 104 while minimizing the portion of the device 100 dedicated to the other user facing sensors 114.

Figure 2:
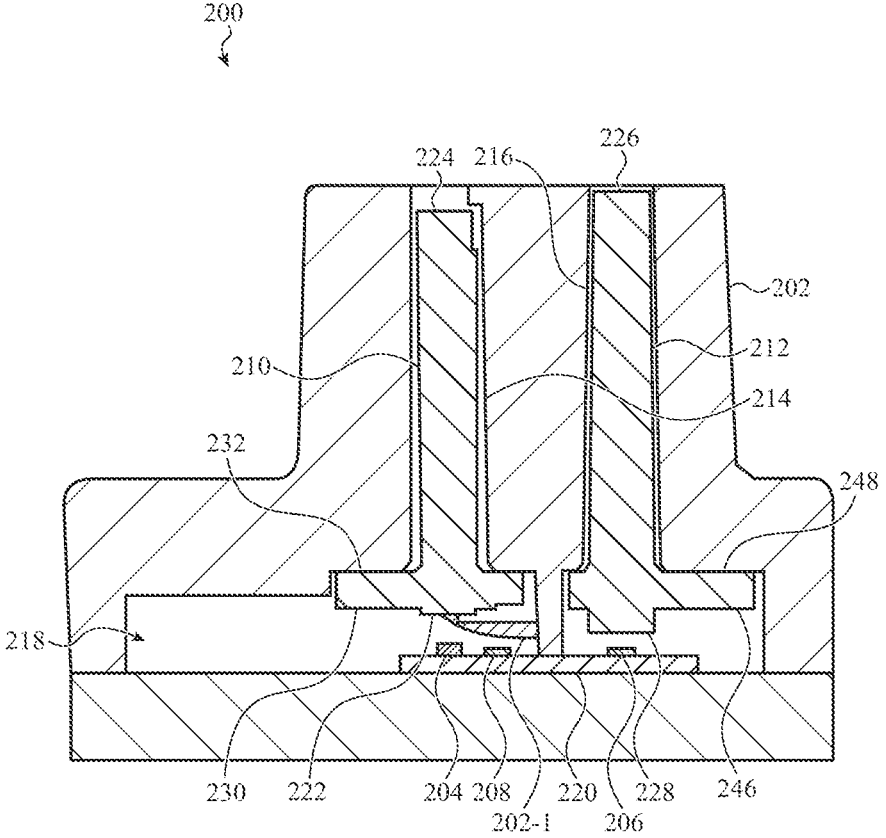
FIG. 2 is a cross-sectional view of an optical proximity sensor, such as described herein.

FIG. 2 is a cross-sectional view of an optical proximity sensor 200, which may be part of an electronic device such as the device 100, such as one of the user-facing sensors 114, according to one embodiment of the present disclosure. The optical proximity sensor 200 includes a housing 202, an optical emitter 204, an optical detector 206, a reference optical detector 208, a first light guide 210, and a second light guide 212. The housing 202 includes a first chimney 214, in which the first light guide 210 is disposed, and a second chimney 216, in which the second light guide 212 is disposed. The optical emitter 204, the optical detector 206, and the reference optical detector 208 may be located in a cavity 218 in the housing 202. Specifically, the optical emitter, the optical detector 206, and the reference optical detector 208 may be located on a substrate 220 in the cavity 218. The first light guide 210 may be positioned to direct light emitted from the optical emitter 204 through the first chimney 214 towards a target location. The second light guide 212 may be positioned to direct a returned portion of the light emitted from the optical emitter 204 (e.g., a portion of the light reflected from an object) through the second chimney 216 towards the optical detector 206.

In operation, the optical emitter 204 is configured to emit light having one or more desired characteristics towards a light input end 222 of the first light guide 210. The light input end 222 of the first light guide 210 may be positioned such that a portion of the light is reflected from the light input end 222 towards the reference optical detector 208, while the remainder of the light enters the first light guide 210 and is directed by the first light guide 210 through the first chimney 214 to a light output end 224 of the first light guide 210. A light input end 226 of the second light guide 212 may receive a returned portion of the light emitted from the optical emitter 204, and direct the returned portion of the light through the second chimney 216 towards a light output end 228 of the second light guide 212. The light output end 228 of the second light guide 212 may be positioned such that the returned portion of the light is directed towards the optical detector 206. Measurements from the optical detector 206 and the reference optical detector 208 may be used to determine the proximity of an object to the optical proximity sensor 200. For example, the optical proximity sensor 200 may be a time of flight (TOF) sensor, and a time difference between when light is detected at the reference optical detector 208 and the optical detector 206 may be used to determine a proximity of an object to the optical proximity sensor 200.

The light output end 224 of the first light guide 210 and the light input end 226 of the second light guide 212 may be exposed through the first chimney 214 and the second chimney 216, respectively, to provide a light emission path and a light reception path for the optical proximity sensor 200 in an electronic device, such as the device 100 described in FIG. 1. Accordingly, the optical proximity sensor 200 may require a first opening and a second opening in a user-facing portion of a device, as shown in FIG. 1.

The housing 202 may comprise plastic, metal, or any other suitable material. The first light guide 210 and the second light guide 212 may comprise the same or different dielectric materials. For example, the first light guide 210 and the second light guide 212 may comprise plastic. Accordingly, the first light guide 210 and the second light guide 212 may be precisely manufactured (e.g., via an injection molding process), and include additional features which may improve the performance of the optical proximity sensor 200. For example, the first light guide 210 may include a flange 230, which may abut a step 232 of a stepped profile of the first chimney 214. The flange 230 may at least partially define a length that the first light guide 210 extends into the first chimney 214. The first light guide 210 may be fixed in the first chimney 214 via an adhesive provided between the flange 230 and the step 232.

Figure 3A:
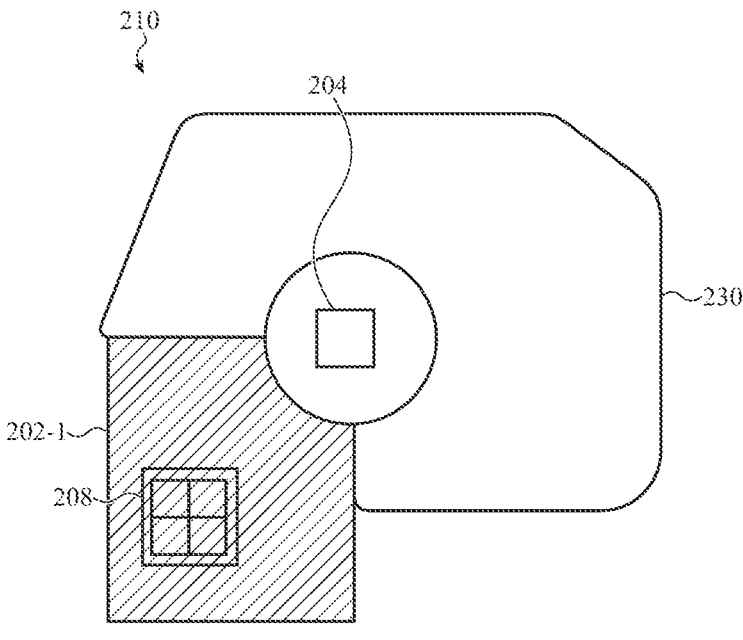
FIGS. 3A through 3D illustrate a light guide for an optical proximity sensor, such as described herein.

As discussed above, a portion of the light emitted from the optical emitter 204 is reflected from the light input end 222 towards the reference optical detector 208. To ensure the accuracy of measurements from the optical proximity sensor 200, it may be desirable to limit the light provided from the optical emitter 204 to the reference optical detector 208 except along a desired path (e.g., limit light from the optical emitter 204 to the reference optical detector 208 except for direct reflections from the light input end 222 of the first light guide 210). Accordingly, the flange 230 may be configured to limit light propagation from the optical emitter 204 to the reference optical detector 208 except along the desired path. This may be accomplished, for example, by providing a cut out in the flange over the reference optical detector 208, as illustrated in FIG. 3A, which shows a top-down view of the first light guide 210, the optical emitter 204, and the reference optical detector 208. As shown, the flange 230 includes a cutout so that it is not provided over the reference optical detector 208. This may prevent light that has entered the first light guide 210 (e.g., via the light input end 222) from internally reflecting in the flange 230 back towards the reference optical detector 208. In addition to the cutout in the flange 230, a portion of the housing 202-1 may also be provided to limit light propagation from the optical emitter 204 to the reference optical detector 208 except along the desired path. This is illustrated in both FIG. 2 and FIG. 3A as a hatched area. The portion of the housing 202-1 may be sized, shaped, and positioned to shield the reference optical detector 208 from light from the optical emitter 204 except along the desired path. The flange 230 of the first light guide 210 may comprise the same or a different dielectric material than the shaft 238 (e.g., the flange 230 may comprise a less reflective dielectric material), and additionally or alternatively may be coated in an opaque coating. This may further limit light propagation from the optical emitter 204 to the reference optical detector 208, except along the desired path.

Figure 3B:
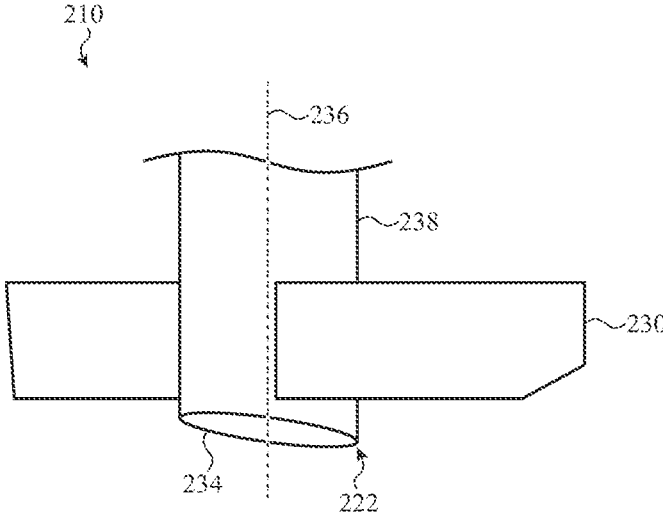

In addition to the flange 230, a surface of the light input end 222 of the first light guide 210 may be tilted towards the reference optical detector 208 to increase and/or better control the light provided from the optical emitter 204 to the reference optical detector 208. This is illustrated in FIG. 3B, which shows details of the light input end 222 of the first light guide 210. As shown, the light input end 222 of the first light guide 210 includes a light input surface 234, which is tilted with respect to an axis 236 of a shaft 238 of the first light guide 210 (the shaft 238 being between the light input end 222 and the light output end 224) to better reflect light emitted from the optical emitter 204 towards the reference optical detector 208. In particular, the light input surface 234 may be tilted at a non-perpendicular angle with respect to the axis 236 of the shaft 238 towards the reference optical detector 208. In addition to the tilt, a surface finish of the light input surface 234 may be configured to reflect a desired amount of light emitted from the optical emitter 204 towards the reference optical detector 208, while allowing the remainder of the light to pass into the first light guide 210. This may include, for example, a polish on the light input surface 234 or one or more coatings applied to the light input surface 234.

Figure 3C:
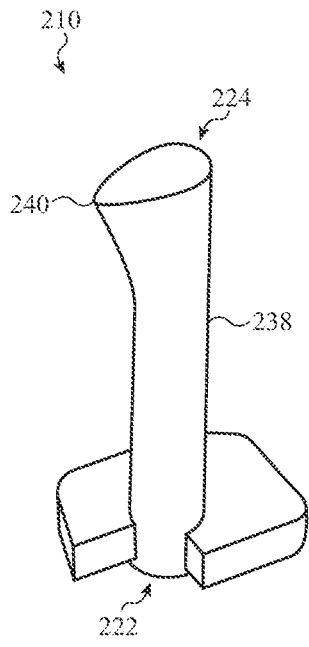
Figure 3D:
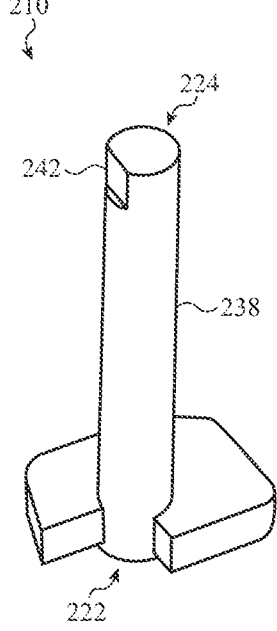

One issue that may affect the sensing accuracy of the optical proximity sensor 200 is crosstalk. Crosstalk refers to light emitted from the optical emitter 204 and received by the optical detector 206 that is not reflected from a desired object (i.e., that is received by the optical detector 206 regardless of whether there is an object in the path of the emitted light). This may occur, for example, due to internal reflections of light emitted from the optical emitter 204 in a glass panel behind which the optical proximity sensor 200 is provided. In some embodiments, a shape of the first light guide 210 may be provided to reduce crosstalk, as illustrated in FIGS. 3C and 3D. Specifically, FIG. 3C shows the shaft 238 of the first light guide 210 transitioning between a circular cross-section and an oval or wedge-shaped cross-section between the light input end 222 and the light output end 224. As shown, the shaft 238 of the first light guide 210 has a circular cross-section up until a transition point, at which the cross-section begins to transition to an oval cross-section ending at the light output end 224. The light output end 224 may thus be defined by an oval perimeter having an apex 240. In some embodiments, the apex 240 may be oriented away from the second light guide 212. Providing the first light guide 210 in this manner may reduce reflections along one or more paths/angles that contribute heavily to crosstalk, thereby improving the performance of the optical proximity sensor 200.

FIG. 3D shows the light output end 224 of the first light guide 210 being defined by a circular segment cutout 242. That is, the light output end 224 of the first light guide 210 is shown having a circular perimeter including a cutout 242. The cutout 242 may extend from the light output end 224 for some distance into the shaft 238. In some embodiments, the cutout 242 may be oriented towards the second light guide 212. Providing the first light guide 210 in this manner may similarly reduce reflections along one or more paths/angles that contribute heavily to crosstalk, thereby improving performance of the optical proximity sensor 200.

Figure 4A:
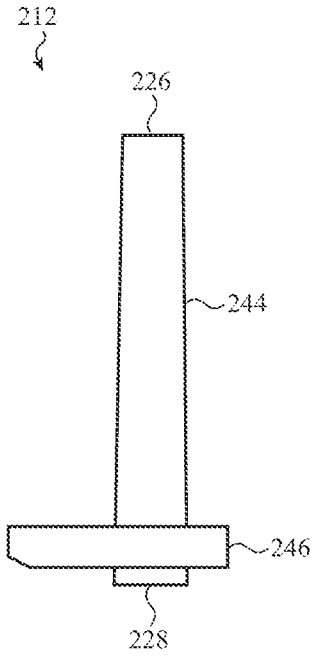
FIGS. 4A and 4B illustrate a light guide for an optical proximity sensor, such as described herein.

The second light guide 212 may also include features for improving the performance of the optical proximity sensor 200. For example, FIG. 4A shows the second light guide 212 having a tapered shaft 244 between the light input end 226 and the light output end 228. In particular, a cross-sectional area of the shaft 244 may increase between the light input end 226 and the light output end 228. Tapering the shaft 244 may convert high angle light to low angle light, which may improve a sensitivity of the optical proximity sensor 200.

Figure 4B:
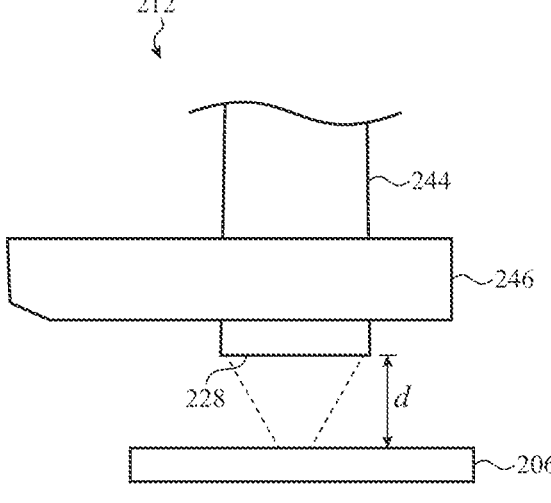

Additionally, the second light guide 212 may include a flange 246, which may abut a step 248 in a stepped profile of the second chimney 216, as shown in FIG. 2 and in further detail in FIG. 4B. The flange 246 may at least partially define a length that the second light guide 212 extends into the second chimney 216. The second light guide 212 may be fixed in the second chimney 216 via an adhesive provided between the flange 246 and the step 248. The flange 246 may additionally at least partially define a distance d between the light output end 228 of the second light guide 212 and the optical detector 206. The distance between the light output end 228 of the second light guide 212 and the optical detector 206 may affect the performance of the optical proximity sensor 200, as it may define a field of view and accepting angle of the optical detector 206. The flange 246, along with the portion of the shaft 244 between the flange 246 and the light output end 228, may precisely set the distance between the light output end 228 and the optical detector 206 to set a desired field of view and accepting angle, which may improve the performance of the optical proximity sensor 200 by further reducing crosstalk. Further, the configuration of the second light guide 212 may make it easy to reproduce a particular distance between the light output end 228 and the optical detector 206 during manufacturing. The flange 246 of the second light guide 212 may comprise the same or a different dielectric material as the shaft 244, and additionally or alternatively may be coated in an opaque coating to control light leakage from the flange 246 to the optical detector 206.

Figure 5A:
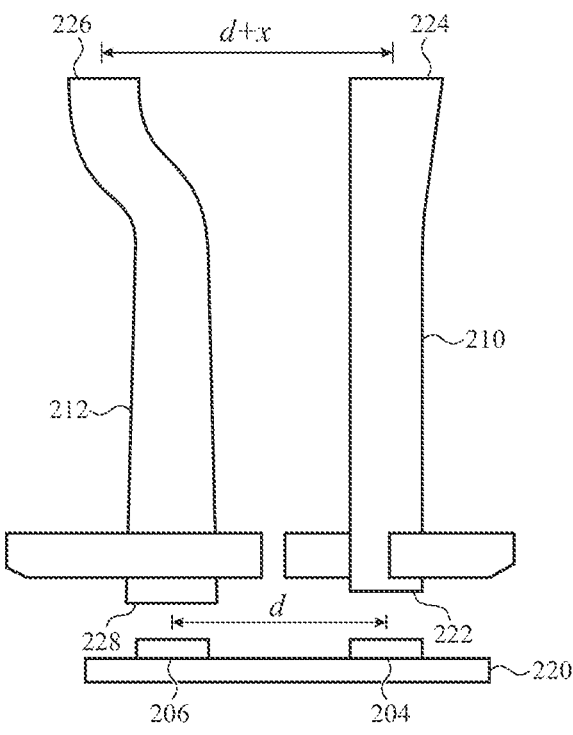
FIGS. 5A and 5B illustrate light guides for an optical proximity sensor, such as described herein.

Another important parameter affecting the performance of the optical proximity sensor 200 is the distance between the location at which light from the optical emitter 204 is emitted towards the target location and the location at which light is collected for the optical detector 206. If the distance is too large, there will be a blind spot in which objects cannot be detected. If the distance is too close, crosstalk between the optical emitter 204 and optical detector 206 will degrade the performance of the sensor. In some embodiments, the optical emitter 204 and the optical detector 206 may be located a fixed distance from one another, for example, on the substrate 220. This is illustrated in FIG. 5A, which shows the optical emitter 204, the optical detector 206, the substrate 220, the first light guide 210, and the second light guide 212. As shown, the optical emitter 204 is located distance d from the optical detector 206. The distance between the optical emitter 204 and the optical detector 206 may be suboptimal due to excessive crosstalk or the presence of a detection blind spot.

Figure 5B:
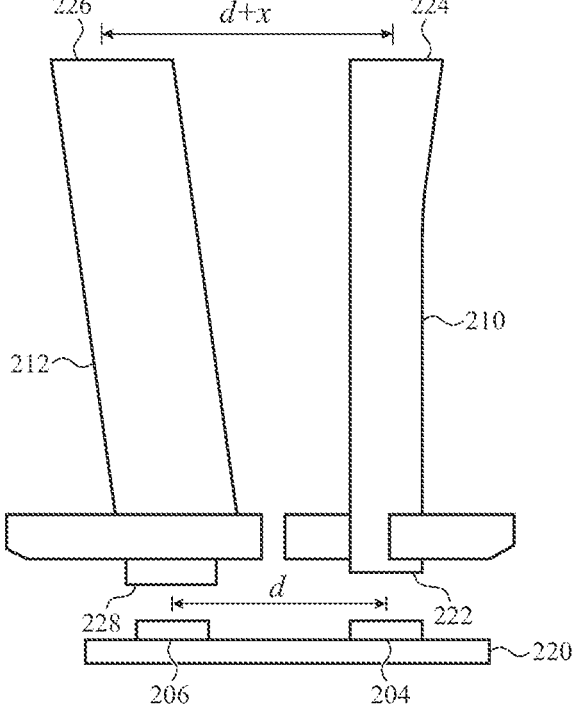

Accordingly, one or both of the first light guide 210 and the second light guide 212 may be shaped to increase or otherwise change the distance between the location from which light from the optical emitter 204 is emitted towards the target location and the location at which light is collected for the optical detector 206. As shown in FIG. 5A, the second light guide 212 may include a bend, which increases the distance between the light output end 224 of the first light guide 210 and the light input end 226 of the second light guide 212 (to d+x). In other words, one or both of the first light guide 210 and the second light guide 212 may be shaped or otherwise configured so that the distance between the light input end 222 of the first light guide 210 and the light output end 228 of the second light guide 212 is less than or otherwise different than the distance between the light output end 224 of the first light guide 210 and the light input end 226 of the second light guide 212. This may be useful for reducing crosstalk, preventing blind spots, or integrating the optical proximity sensor 200 with other components. FIG. 5B similarly shows the first light guide 210 and the second light guide 212 arranged to alter a distance between the location from which light from the optical emitter 204 is emitted towards the target location and the location at which light is collected for the optical detector 206. Instead of a bend in the second light guide 212 as shown in FIG. 5A, the second light guide 212 may be provided such that the shaft 244 thereof is angled between the light input end 226 and the light output end 228. Notably, the configurations shown in FIGS. 5A and 5B are merely exemplary, and any suitable configuration for the first light guide 210 and the second light guide 212 that alters the distance between the location from which light from the optical emitter 204 is emitted towards the target location and the location at which light is collected for the optical detector 206 is contemplated herein.

Figure 6:
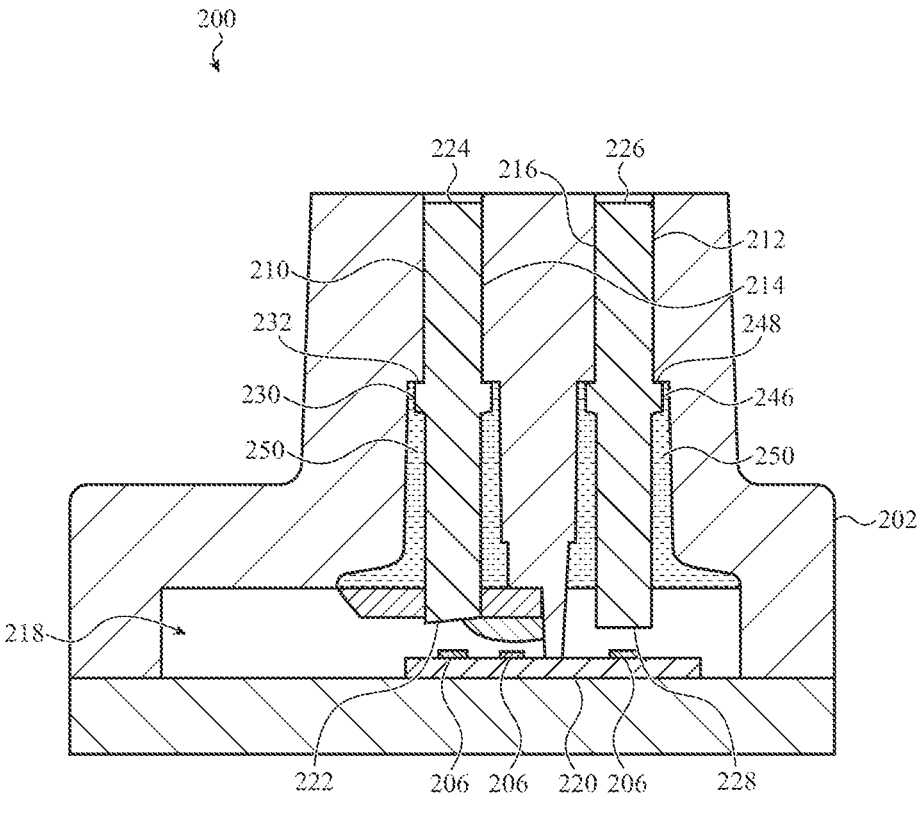
FIG. 6 is a cross-sectional view of an optical proximity sensor, such as described herein.

FIG. 6 shows a cross-sectional view of an optical proximity sensor 200 according to an additional embodiment of the present disclosure. The optical proximity sensor 200 shown in FIG. 6 is substantially similar to that shown in FIG. 2, except that the flange 230 of the first light guide 210 and the flange 246 of the second light guide 212, as well as the step 232 in the stepped profile of the first chimney 214 and the step 248 in the stepped profile of the second chimney 216 are moved away from the substrate 220 and thus the optical emitter 204, the optical detector 206, and the reference optical detector 208. The stepped profile of the first chimney 214 is also adjusted to leave additional clearance around a portion of the first light guide 210 below the step 232. Similarly, the stepped profile of the second chimney 216 is adjusted to leave additional clearance around a portion of the second light guide 212 below the step 248. The stepped profile of the first chimney 214 may be sized and shaped to allow an adhesive 250 to distribute evenly to surround or partially surround the first light guide 210 and the flange 230 and up to the step 232. Similarly, the stepped profile of the second chimney 216 may be sized and shaped to allow the adhesive 250 to distribute evenly to surround or partially surround the second light guide 212 and the flange 246 and up to the step 248. The adhesive 250 may automatically align the first light guide 210 in the first chimney 214 and the second light guide 212 in the second chimney 216 during manufacturing, without additional support or alignment guides, which may simplify the manufacture of the optical proximity sensor. In some embodiments, the first chimney 214 and the second chimney 216 may include flared openings at a bottom thereof to enable easier application of adhesive 250 within the chimneys.

Figure 7:
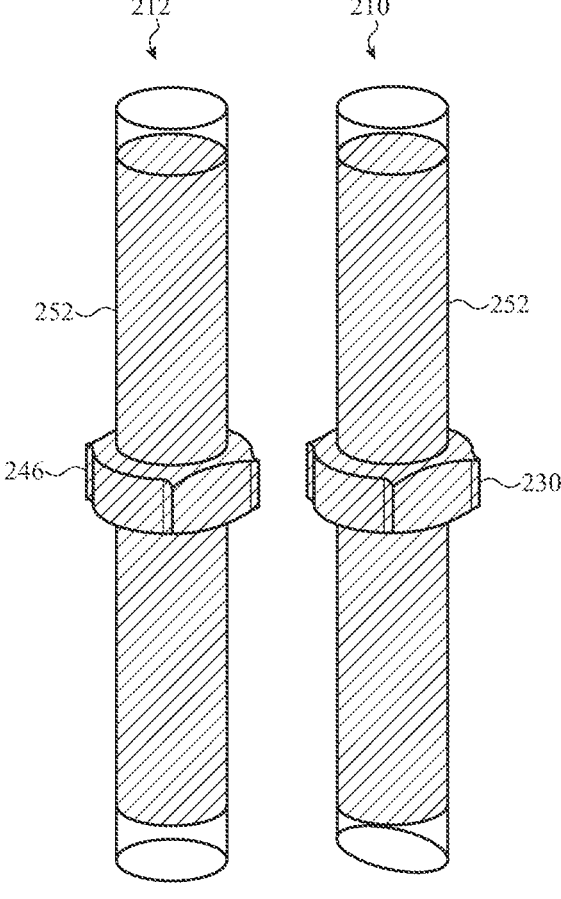
FIG. 7 illustrates light guides for an optical proximity sensor, such as described herein.

FIG. 7 shows details of the first light guide 210 and the second light guide 212 in the configuration of the optical proximity sensor 200 shown in FIG. 6. As shown, the flange 230 on the first light guide 210 and the flange 246 on the second light guide 212 are located near a center thereof, rather than towards the bottom as previously shown. In some embodiments, a portion of the first light guide 210 and the second light guide 212 may be coated with a high-reflectivity (HR) coating 252, such as gold or layers of gold, titanium, and silicon dioxide. In particular, a center portion of the first light guide 210 and the second light guide 212 may be coated with the HR coating 252, while the ends of the first light guide 210 and the second light guide 212 are left uncoated. The HR coating 252 on the first light guide 210 and the second light guide 212 may be especially useful in the configuration of the optical proximity sensor 200 shown in FIG. 6, since the adhesive 250 may interfere with reflectivity within the first light guide 210 and the second light guide 212 in some cases. However, the HR coating 252 may be provided on any portion of the first light guide 210 and/or the second light guide 212 regardless of the configuration of the optical proximity sensor 200. While not shown, the first light guide 210 and the second light guide 212 in the present configuration may include any combination of the features discussed with respect to FIGS. 3A through 5B.

Figure 8:
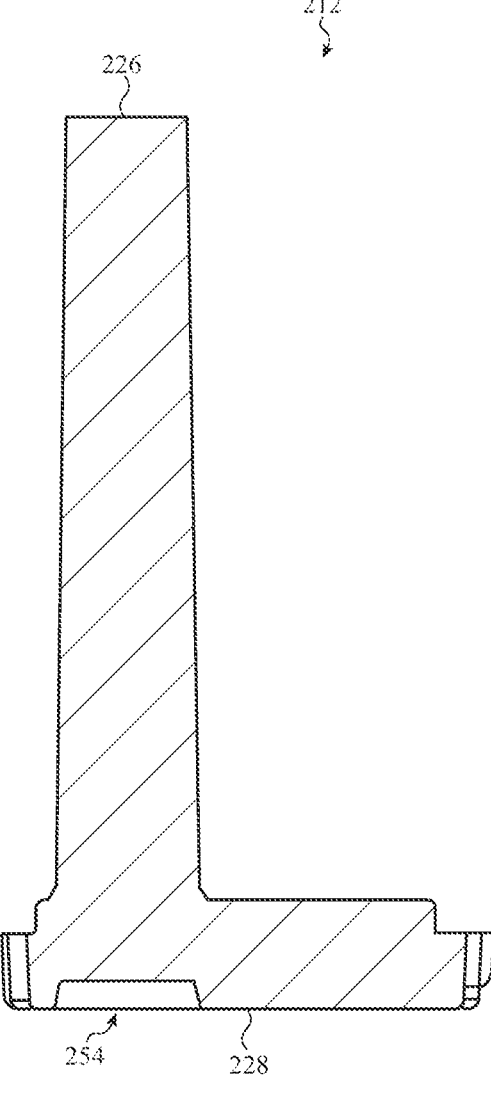
FIG. 8 illustrates a light guide for an optical proximity sensor, such as described herein.

Turning back to the optical proximity sensor 200 discussed with respect to FIG. 2 or 6, the second light guide 212 may include additional or alternative features for improving the performance of the optical proximity sensor 200. For example, FIG. 8 shows the second light guide 212 including an angular converter 254 at the light output end 228 thereof. The angular converter 254 may convert large angle light signals (light signals having an angle with respect to a surface of the light output end 228 above a threshold value) to lower angle light signals so that the large angle light signals impinge on the optical detector 206. In some embodiments, the angular converter 254 may alternatively or additionally convert small angle light signals (light signals having an angle with respect to a surface of the light output end 228 below a threshold value) to larger angle light signals so that the small angle light signals impinge on the optical detector 206. That is, the angular converter 254 may redirect light that would otherwise exit the light output end 228 such that it avoids the optical detector 206 so that it instead impinges on and is thus detected by the optical detector 206. Additionally or alternatively, the angular converter 254 may redirect light that would otherwise exit the light output end 228 such that it impinges on the optical detector so that it instead avoids and is thus not detected by the optical detector 206. In other words, the angular converter 254 may act as a kind of optical filter, which may enhance or suppress specific ranges of angular light signals.

Figure 9A:
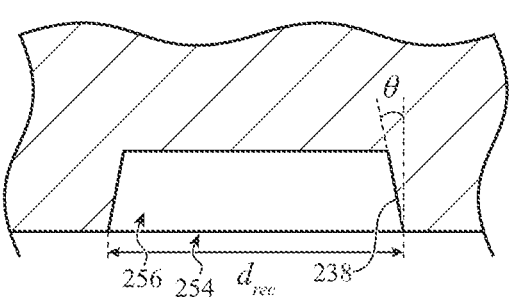
FIGS. 9A through 9C illustrate an angular converter for a light guide, such as described herein.
Figure 9B:
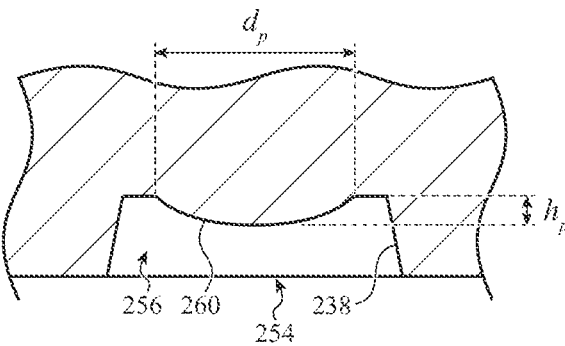
Figure 9C:
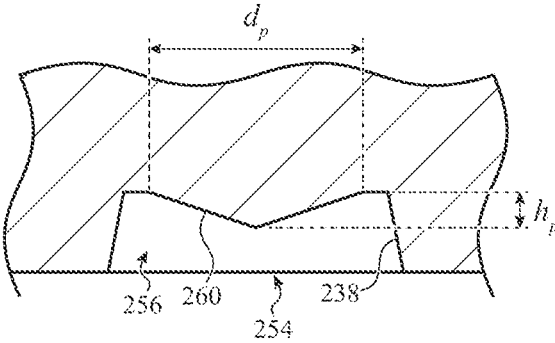

FIGS. 9A through 9C show various configurations of the angular converter 254. In FIG. 9A, the angular converter 254 is provided as a recess 256 having a sidewall 258. The recess 256 may be provided at a certain diameter $d_r$. The sidewall 258 may have a draft angle θ with respect to a surface of the light output end 228, which may function to convert large angle light signals to lower angle light signals so that they impinge on the optical detector 206. FIG. 9B shows the angular converter 254 further including a protrusion 260 in the recess 256. The protrusion 260 may be defined by a diameter $d_p$ and a height $h_p$. The protrusion 260 may function to convert small angle light signals to larger angle light signals so that they impinge on the optical detector 206 and thus are detected. FIG. 9C shows the angular converter 254 wherein the protrusion 260 is provided in a cone shape, rather than a dome shape as in FIG. 9B. The protrusion 260 functions the same as discussed above, converting small angle light signals to larger angle light signals so that they impinge on the optical detector 206.

Notably, the structures shown for the angular converter 254 are only exemplary. In general, the present disclosure contemplates the use of any structures, such as recesses, lenses, prisms, and the like, to enhance or suppress specific angles of light, which may improve proximity detection and/or reduce manufacturing tolerance sensitivity of the optical proximity sensor 200.

Figure 10:
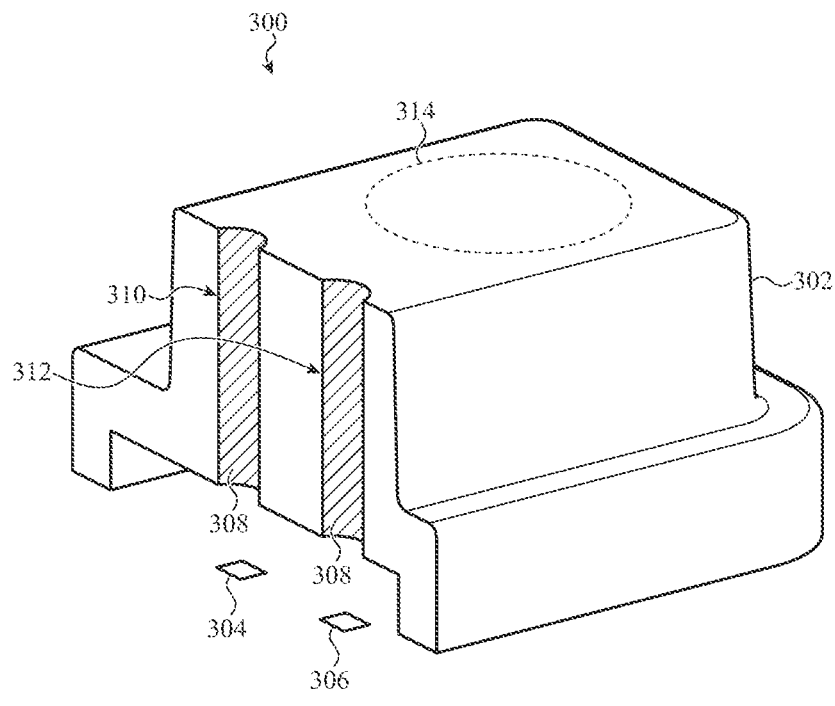
FIG. 10 is a cross-sectional view of an optical proximity sensor, such as described herein.

FIG. 10 is a simplified cross-sectional view of an optical proximity sensor 300 according to an additional embodiment of the present disclosure. The optical proximity sensor 300 includes a housing 302, an optical emitter 304, and an optical detector 306. Notably, the optical proximity sensor 300 does not include light guides, but rather includes an HR coating 308 in a first chimney 310 and a second chimney 312 in the housing 302. The HR coating 308 in the first chimney 310 may be the same as or different from the HR coating in the second chimney 312. The optical proximity sensor 300 operates similarly as discussed above with respect to FIG. 2, except that light is guided from the optical emitter 304 through the first chimney 310 and towards a target location via reflections due to the HR coating 308 in the first chimney 310, and a returned portion of the light is guided through the second chimney 312 towards the optical detector 306 via reflections due to the HR coating 308 in the second chimney 312. Replacing the light guides with HR coating on an inside of the first chimney 310 and the second chimney 312 may further simplify the manufacture of the optical proximity sensor 300. In various embodiments, the HR coating 308 may comprise gold, or layers of gold, titanium, and silicon-dioxide.

The housing 302, and thus the first chimney 310 and the second chimney 312 may be part of a monolithic component or a multi-part component. In one embodiment, the housing 302 is split into multiple components such that the first chimney 310 and the second chimney 312 are formed by mating the components of the housing 302. The components of the housing 302 may be attached by glue, welds, one or more fasteners, or in any other suitable way. The housing 302 may comprise plastic, metal, or any other suitable material. In some embodiments, providing the first chimney 310 and the second chimney 312 via multiple components of the housing 302 that mate together may make it easier to apply the HR coating 308 in a uniform manner, which may improve the performance of the optical proximity sensor 300, compared to embodiments wherein the housing 302 is a monolithic element. This may be especially true when the first chimney 310 an the second chimney 312 have a relatively small diameter and a long length.

The housing 302 may include one or more additional openings 314, which may be configured to align or otherwise position one or more additional sensors or components. For example, the housing 302 may include an additional opening 314 through which a camera module is provided so as to be positioned along with the optical proximity sensor 300. While not shown, the housing of the optical proximity sensors described with respect to FIGS. 2 and 6 may also include additional openings serving the same purpose.

Figure 11:
FIG. 11 is an electronic block diagram of an electronic device, such as described herein.
Figure 11:
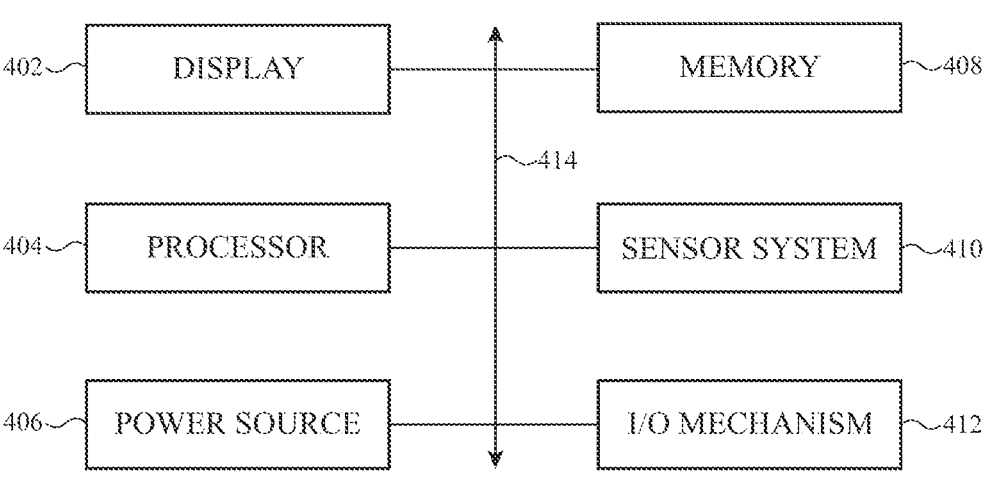

FIG. 11 shows a sample electrical block diagram of an electronic device 400, which may in some cases take the form of the device described with reference to FIGS. 1A-1B and/or include an optical proximity sensor as described with reference to any of FIGS. 2-10. The electronic device 400 may include a display 402 (e.g., a light-emitting display), a processor 404, a power source 406, a memory 408 or storage device, a sensor system 410, or an input/output (I/O) mechanism 412 (e.g., an input/output device, input/output port, or haptic input/output interface). The processor 404 may control some or all of the operations of the electronic device 400. The processor 404 may communicate, either directly or indirectly, with some or all of the other components of the electronic device 400. For example, a system bus or other communication mechanism 414 can provide communication between the display 402, the processor 404, the power source 406, the memory 408, the sensor system 410, and the I/O mechanism 412.

The processor 404 may be implemented as any electronic device capable of processing, receiving, or transmitting data or instructions, whether such data or instructions is in the form of software or firmware or otherwise encoded. For example, the processor 404 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements.

It should be noted that the components of the electronic device 400 can be controlled by multiple processors. For example, select components of the electronic device 400 (e.g., the sensor system 410) may be controlled by a first processor and other components of the electronic device 400 (e.g., the display 402) may be controlled by a second processor, where the first and second processors may or may not be in communication with each other.

The power source 406 can be implemented with any device capable of providing energy to the electronic device 400. For example, the power source 406 may include one or more batteries or rechargeable batteries. Additionally or alternatively, the power source 406 may include a power connector or power cord that connects the electronic device 400 to another power source, such as a wall outlet.

The memory 408 may store electronic data that can be used by the electronic device 400. For example, the memory 408 may store electrical data or content such as, for example, audio and video files, documents and applications, device settings and user preferences, timing signals, control signals, and data structures or databases. The memory 408 may include any type of memory. By way of example only, the memory 408 may include random access memory, read-only memory, Flash memory, removable memory, other types of storage elements, or combinations of such memory types.

The electronic device 400 may also include one or more sensor systems 410 positioned almost anywhere on the electronic device 400. In some cases, sensor systems 410 may be positioned as described with reference to FIGS. 1A-1B. The sensor system(s) 410 may be configured to sense one or more type of parameters, such as but not limited to, light; touch; force; heat; movement; relative motion; biometric data (e.g., biological parameters) of a user; particulate matter concentration; air quality; proximity (i.e., via an optical proximity sensor as described herein); position; connectedness; and so on. By way of example, the sensor system(s) 410 may include a temperature sensor, a position sensor, a light or optical sensor, an accelerometer, a pressure transducer, a gyroscope, a magnetometer, a health monitoring sensor, a particulate matter sensor, an air quality sensor, and so on. Additionally, the one or more sensor systems 410 may utilize any suitable sensing technology, including, but not limited to, magnetic, capacitive, ultrasonic, resistive, optical, acoustic, piezoelectric, or thermal technologies.

The I/O mechanism 412 may transmit or receive data from a user or another electronic device. The I/O mechanism 412 may include the display 402, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 412 may transmit electronic signals via a communications interface, such as a wireless, wired, and/or optical communications interface. Examples of wireless and wired communications interfaces include, but are not limited to, cellular and Wi-Fi communications interfaces.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. An optical proximity sensor, comprising:
a housing defining a first chimney and a second chimney;
an optical emitter;
an optical detector;
a first light guide disposed in the first chimney and positioned above the optical emitter, the first light guide comprising a first dielectric material and configured to direct light emitted from the optical emitter through the first chimney; and
a second light guide disposed in the second chimney and positioned above the optical detector, the second light guide comprising a second dielectric material and configured to direct a returned portion of the light emitted from the optical emitter through the second chimney towards the optical detector, wherein:
the first light guide comprises a flange that at least partially defines a length that the first light guide extends into the first chimney.

2. The optical proximity sensor of claim 1, wherein the second light guide comprises:
a light input end positioned to receive the returned portion of the light emitted from the optical emitter;
a light output end positioned to direct the returned portion of the light emitted from the optical emitter towards the optical detector; and
a shaft disposed between the light input end and the light output end, the shaft having a taper that increases a cross-sectional area of the shaft as the shaft extends away from the light input end of the second light guide.

3. The optical proximity sensor of claim 1, wherein:

the first chimney and the second chimney share a common base;

the first light guide extends for a first length into the first chimney; and the second light guide extends for a second length into the second chimney, the second length being different from the first length.

4. The optical proximity sensor of claim 1, wherein:

the first light guide comprises a light input end positioned to receive light emitted from the optical emitter, the light input end being positioned a first distance away from the optical emitter; and the second light guide comprises a light output end positioned to direct the returned portion of light towards the optical detector, the light output end being positioned a second distance away from the optical detector, the second distance being different than the first distance.

5. The optical proximity sensor of claim 1, wherein:

the first chimney has a stepped profile; and the flange abuts a step in the stepped profile of the first chimney.

6. The optical proximity sensor of claim 5, further comprising an adhesive disposed between the flange and the step.

7. The optical proximity sensor of claim 1, wherein:

the optical proximity sensor further comprises a reference optical detector configured to receive a portion of the light emitted from the optical emitter; and the flange is configured to limit light propagation from the optical emitter to the reference optical detector.

8. The optical proximity sensor of claim 7, wherein a portion of the housing is configured to further limit light propagation from the optical emitter to the reference optical detector.

9. The optical proximity sensor of claim 1, wherein:

the flange is a first flange; and the second light guide comprises a second flange, the second flange at least partially defining a length that the second light guide extends into the second chimney.

10. The optical proximity sensor of claim 9, further comprising a coating on the second flange that is opaque to the light emitted from the optical emitter.

11. The optical proximity sensor of claim 1, wherein:

the flange is a first flange; and the second light guide comprises a second flange, the second flange comprising a third dielectric material that is different from the second dielectric material.

12. The optical proximity sensor of claim 1, wherein the first light guide comprises:

a shaft; and a light input end positioned to receive light emitted from the optical emitter, the light input end having a light input surface, which is tilted at a non-perpendicular angle with respect to an axis of the shaft.

13. The optical proximity sensor of claim 1, wherein:

the first light guide comprises a light output end positioned to direct the light emitted from the optical detector towards a target location;

the second light guide comprises a light input end positioned to receive the returned portion of the emitted light;

the optical emitter and the optical detector are separated by a first distance; and the light output end of the first light guide and the light input end of the second light guide are separated by a second distance, which is different than the first distance.

14. The optical proximity sensor of claim 1, wherein the first light guide comprises:

a light input end positioned to receive light emitted from the optical emitter; and a light output end positioned to direct the light emitted from the optical emitter towards a target location, the light output end being defined by a circular segment cutout.

15. The optical proximity sensor of claim 14, wherein the circular segment cutout is oriented towards the second light guide.

16. The optical proximity sensor of claim 1, wherein the first light guide comprises:

a light input end positioned to receive light emitted from the optical emitter;

a light output end positioned to direct the light emitted from the optical detector towards a target location; and a shaft between the light input end and the light output end, the shaft transitioning between a circular cross-section and an oval cross-section between the light input end and the light output end.

17. The optical proximity sensor of claim 1, wherein the second light guide comprises:

a light input end positioned to receive the returned portion of the light emitted from the optical emitter;

a light output end positioned to direct the returned portion of the light emitted from the optical emitter towards the optical detector; and an angular converter on the light output end, the angular converter configured to redirect light in the second light guide towards the optical detector.

18. The optical proximity sensor of claim 17, wherein the angular converter is further configured to:

redirect light having one or more first angles with respect to a surface of the light output end towards the optical detector; and redirect light having one or more second angles with respect to the surface of the light output end away from the optical detector.

* * * * *